INVENTORS
LEO E. PUCHER
BY WILLIAM A. CUNNINGHAM
ATTORNEYS

Patented May 26, 1953

2,640,091

UNITED STATES PATENT OFFICE 2,640,091

BATTERY

Leo E. Pucher, South Euclid, and William A. Cunningham, Cleveland, Ohio, assignors to Willard Storage Battery Company, Cleveland, Ohio, a corporation of West Virginia Application July 15, 1950, Serial No. 173,966

5 Claims. (Cl. 136—100)

The present invention relates to batteries and, more particularly, to primary batteries capable of activation by the mere addition of water to the container and to a method of making the same.

Because batteries have a limited shelf life, there is considerable demand for a battery that can be stored dry for any period of time and quickly and conveniently activated merely by the addition of water.

The principal object of the present invention is the provision of a novel and improved battery of the character mentioned which is relatively rugged in construction, inexpensive to manufacture, and has good operating characteristics over a wide temperature range.

Another object of the invention is the provision of a novel and improved method of making a battery of the character referred to in the preceding object.

Figure 1:
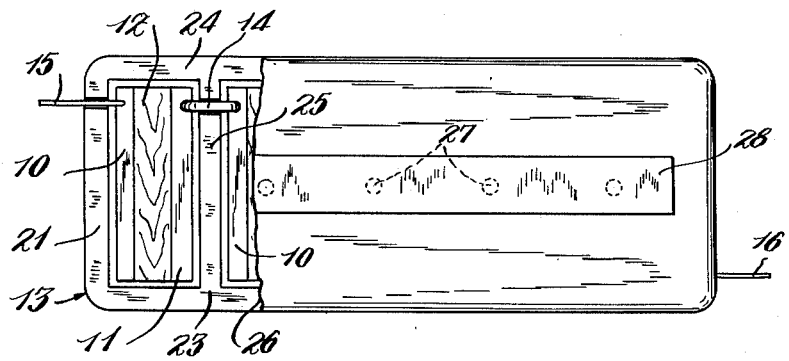
Figure 2:
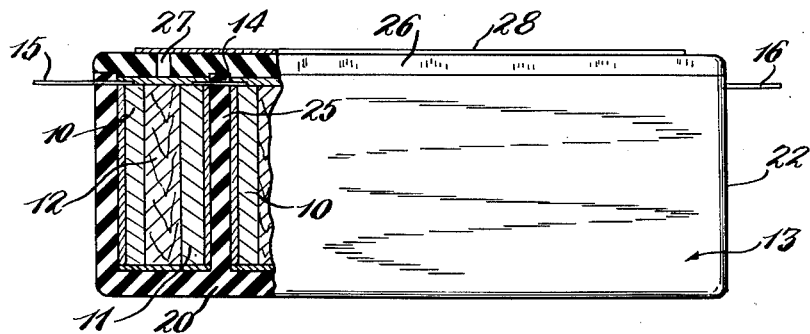

The invention resides in certain constructions and combinations and arrangements of parts and further objects and advantages thereof will be apparent to those skilled in the art to which the invention relates from the following description of the preferred embodiment described with reference to the accompanying drawing forming a part of this specification, and in which Fig. 1 is a plan view, with portions broken away to show the interior construction, of a battery embodying the present invention; and Fig. 2 is a side elevational view, with portions broken away, of the battery shown in Fig. 1.

Referring to the drawings, the battery shown therein is of the multi-cell type and comprises a plurality of battery elements each including a negative plate 10 and a positive plate 11 separated from each other by an insulator 12 made of wood or other suitable material, preferably an absorbent material, such as bark fiber. The battery elements are housed within a suitable multi-compartment or cell container 13 and the respective plates of each cell are connected to the plates of opposite polarity of the adjacent cell by intercell connectors 14, with the exception of the two end cells, the non-connected plates of which are connected to terminal wires 15, 16 projecting through the container 13.

The container 13 is made of any suitable material, such as, polystyrene and, as shown, comprises a bottom 20, end walls 21, 22, side walls 23, 24, partitions 25, and a removable cover 26. The cover 26 is preferably cemented to the container proper after the battery elements are assembled therein and the necessary internal connections made. The cover 26 is provided with filler openings 27, one communicating with each of the cell compartments through which water may be admitted when it is desired to activate the battery. As previously stated, the insulators which separate the respective plates of each battery element are preferably made of absorbent material and each battery element is preferably completely enclosed in similar material before it is assembled in the container. When so constructed and the battery is activated by the addition of water there is little, if any, free liquid in the container and it is not necessary to seal the filler openings during use in order to avoid spilling the liquid or electrolyte.

The negative plates 10 are preferably formed of sheet magnesium; however, other forms of magnesium may be used, such as, magnesium screen or powdered magnesium suitably secured to or retained in a suitable grid. In the battery shown, the negative plates are about .016" thick and are formed of sheet magnesium.

The positive plates 11 shown are of the pasted grid type and comprise hydrated cuprous chloride pasted upon a grid preferably one formed of copper screen wire. The hydrated cuprous chloride is mixed with water until a paste of the desired consistency is obtained. This paste is then applied to the copper screen in any suitable manner. After pasting, the plate is preferably dried before it is assembled in a battery.

The addition of a small quantity, for example, up to about 4% of silver chloride to the hydrated cuprous chloride paste produces a paste that is easy to handle and apply or paste and has a short setting time. The silver chloride appears to cement or bond the hydrated cuprous chloride together and grids pasted with this material have good mechanical strength. The paste does not flake off and adheres well to the grid material. The silver chloride also tends to increase the voltage and capacity of the cell.

The addition of a small quantity of either or both ammonium chloride and potassium chloride to the positive plate paste increases the operating temperature range and otherwise improves the cell. For example, potassium chloride because of the rapidity with which it ionizes when water is added to the cell, reduces the time required for activation when it is desired to place the cell in service. At high temperatures the cell may overheat and fail; however, this can be overcome by the addition of ammonium chloride which tends to restrict the effect of the potassium chloride. Both potassium chloride and ammonium chloride but, more specifically, potassium chloride, improves the conductivity of the cell and in this way increases or improves the operation of the battery at low temperatures. A small quantity of electrolytic copper dust may also be added to the paste to reduce the resistance of the cell, if desired.

The specific amounts of silver chloride, ammonium chloride and/or potassium chloride used may vary according to the particular use for which the battery is designed. For example, if it is desired to produce a battery having a short activation period and life but a high discharge rate at low temperatures, larger amounts of potassium chloride would be employed than in the case of a battery where a longer activation period and a lower discharge rate would be acceptable or satisfactory.

In making the paste, the hydrated cuprous chloride, the silver chloride, and the copper dust, if employed, are mixed together in dry powdered form. To this is added an ammonium chloride and/or potassium chloride solution to produce a mix having a consistency that can be conveniently pasted on a grid. In the event neither ammonium chloride nor potassium chloride is used, plain water is employed in place of the solution referred to. The grid is preferably a copper screen of any appropriate size which will support the paste.

By way of example, a very satisfactory paste was produced by grinding together ninety-six grams of dry hydrated cuprous chloride and up to approximately four grams of dry silver chloride until they were thoroughly mixed and then adding 12 to 17 cc. of water. This mix was then applied to a copper screen 40 x 40 mesh and air-dried over night. The resulting plates were approximately .025" to .035" thick and when assembled with negative magnesium plates of the character mentioned in a suitable container and water added thereto produced a cell having a voltage of about 1.5 volts and a satisfactory temperature operating range from 140° F. to minus 58° F. Somewhat similar results were obtained wherein the water solution used to make the pastes contained ammonium chloride from approximately 0.1% to 0.4% and/or potassium chloride from approximately 0.3% to 1.2%. Electrolytic copper dust up to approximately 20% by weight of the dry mixture has also been employed.

Referring again to the drawing, the terminal wires 15, 16 are sealed where they project through the battery container 13 and the filler openings 27 are preferably also sealed as by a strip of moisture-proof tape 28 until the battery is ready to be placed into service. When it is desired to place the battery in service, it is merely necessary to remove the tape 28 and dunk the battery in water for a short period or add water to the cells in some other way through the filler openings 27.

The hydrated cuprous chloride of the present invention may be prepared by exposing anhydrous cuprous chloride to moisture in the presence of air, for example, by placing a shallow tray containing anhydrous cuprous chloride in a steam chamber for a number of hours, for example six, until it changes to a lemon color, after which it is dried. The resulting product cannot be formed by wetting anhydrous cuprous chloride with water and is believed to be copper oxychloride or atacamite. The chemical formula is believed to be $CuCl_2 \cdot 3CuO \cdot 3H_2O$. The expression "hydrated cuprous chloride" as used throughout the present specification and claims refers to material like that which results from treating anhydrous cuprous chloride in the aforementioned manner.

From the foregoing description of the preferred embodiment of the invention, it will be apparent that the objects heretofore enumerated and others have been accomplished and that there has been provided a novel and improved battery that can be stored dry and quickly activated when it is desired to use the same by the mere addition of water. While the preferred embodiment of the invention has been described in considerable detail, the invention is not limited to the particular construction shown and it is our intention to cover hereby all adaptations, modifications and uses thereof which come within the practice of those skilled in the art to which the invention relates.

Having thus described our invention, we claim:

1. A battery comprising a negative plate having magnesium as the active agent and a positive plate having its active material comprising essentially hydrated cuprous chloride.

2. A battery comprising a negative plate having magnesium as the active agent and a positive plate having its active material comprising essentially hydrated cuprous chloride and silver chloride.

3. A battery comprising a negative plate having magnesium as the active agent and a positive plate having its active material comprising essentially hydrated cuprous chloride, and a chloride from the group consisting of silver chloride, potassium chloride, and ammonium chloride.

4. A battery comprising a negative plate having magnesium as the active agent and a positive plate having its active material comprising essentially hydrated cuprous chloride, silver chloride, and a chloride from the group consisting of ammonium chloride and potassium chloride.

5. A battery comprising a negative plate having magnesium as the active agent and a positive plate having its active material comprising essentially hydrated cuprous chloride, and a plurality of chlorides from the group consisting of silver chloride, ammonium chloride and potassium chloride.

LEO E. PUCHER.
WILLIAM A. CUNNINGHAM.

References Cited in the file of this patent

UNITED STATES PATENTS

| Number | Name | Date |
|---|---|---|
| 552,211 | Thurnauer | Dec. 31, 1895 |
| 2,050,172 | Gordon | Aug. 4, 1936 |
| 2,322,210 | Adams | June 22, 1943 |

FOREIGN PATENTS

| Number | Country | Date |
|---|---|---|
| 301,923 | Great Britain | Dec. 7, 1928 |
| 443,983 | Great Britain | Mar. 11, 1936 |
| 867,151 | France | Oct. 3, 1941 |

OTHER REFERENCES

Mellor: Comprehensive Treatise on Inorganic and Theoretical Chemistry, pages 157, 178 and 179, vol. 3, 1922 edition.